INVENTOR.
FRANK B. HALE
BY Millard F. Peake
ATTORNEY.

Aug. 15, 1939    F. B. HALE    2,169,241
VALVE REPLACEMENT MECHANISM
Filed Sept. 21, 1937    7 Sheets-Sheet 4

INVENTOR.
FRANK B. HALE
BY Millard F. Peake
ATTORNEY.

Aug. 15, 1939.   F. B. HALE   2,169,241
VALVE REPLACEMENT MECHANISM
Filed Sept. 21, 1937   7 Sheets-Sheet 7

INVENTOR.
FRANK B. HALE
BY Millard F. Peake
ATTORNEY.

Patented Aug. 15, 1939

2,169,241

UNITED STATES PATENT OFFICE 2,169,241

VALVE REPLACEMENT MECHANISM

Frank B. Hale, Bel Air, Md.

Application September 21, 1937, Serial No. 164,913
9 Claims. (Cl. 29—84)

(Granted under the act of March 3, 1883, as amended April 30, 1928; 370 O. G. 757)

The invention described herein may be manufactured and used by or for the Government for governmental purposes without the payment to me of any royalties thereon.

This invention relates to a mechanism for replacing valves of containers in which are stored gases or liquids under high pressure. Although this invention is not limited thereto, it will be described in connection with one-ton metal containers used to store gaseous or liquid chemicals under pressure.

The containers used to store chemicals under pressure must be provided with outlet valves whereby the chemicals may be withdrawn for use. These outlet valves become badly corroded in some cases and must be replaced. It is desirable to effect this replacement with as little loss of the chemical as possible, and without injury to the personnel making the replacement. In some cases the chemicals are poisonous or vesicant and the replacement of the valves is dangerous to the personnel. When the valves on storage containers having chlorine, phosgene, or similar dangerous chemicals are to be changed, the personnel must wear protective devices, including gas masks, protective gloves and protective clothing.

An object of this invention is to provide a mechanism whereby the old valves may be quickly removed and the new valves inserted without material loss of the chemical and without danger to the personnel.

Another object of this invention is to provide a valve changing mechanism whereby the new valve may be quickly positioned over the opening in the container at the correct angle of entrance, or if the new valve may not be inserted and secured in place, the old valve may be quickly replaced.

Another object of this invention is to provide a valve changing mechanism whereby the new valve may be readily held in place against the pressure of the chemical or gas until the threads are started, to thus relieve the operator of exerting any great effort in assembly.

These and various other objects will be apparent from the following description and drawings, wherein Fig. 1 is a front elevation of the complete mechanism;

The metal containers with which the valve replacement mechanism of this invention is to be used have inwardly curved heads or chimes. The valves screwed into the chimes are therefore not parallel to the longitudinal axis of the cylinder, making it necessary to provide for the angularity when changing valves.

In general, the mechanism of this invention comprises a plate adapted to be secured over the end of the container and carrying a ball and socket device. The ball has two parallel openings through which two rods pass, one to fit over and remove the old valve and one to carry the new valve. The ball is adjusted until the old valve rod is in direct alignment with the old valve and is then clamped in this angular position, a new valve being secured to the new valve rod. The old valve is then unscrewed, the ball is quickly rotated 180°, in its socket, thus bringing the new valve over the opening, a pressure handle is operated, and the new valve is screwed in position. If for any reason the new valve may not be screwed in, the ball may be easily turned back and the old valve re-inserted. The entire mechanism may be assembled to a container by two men in about five minutes and only about 2 to 3 seconds elapse between removal of the old valve and insertion of the new one.

Figure 6:
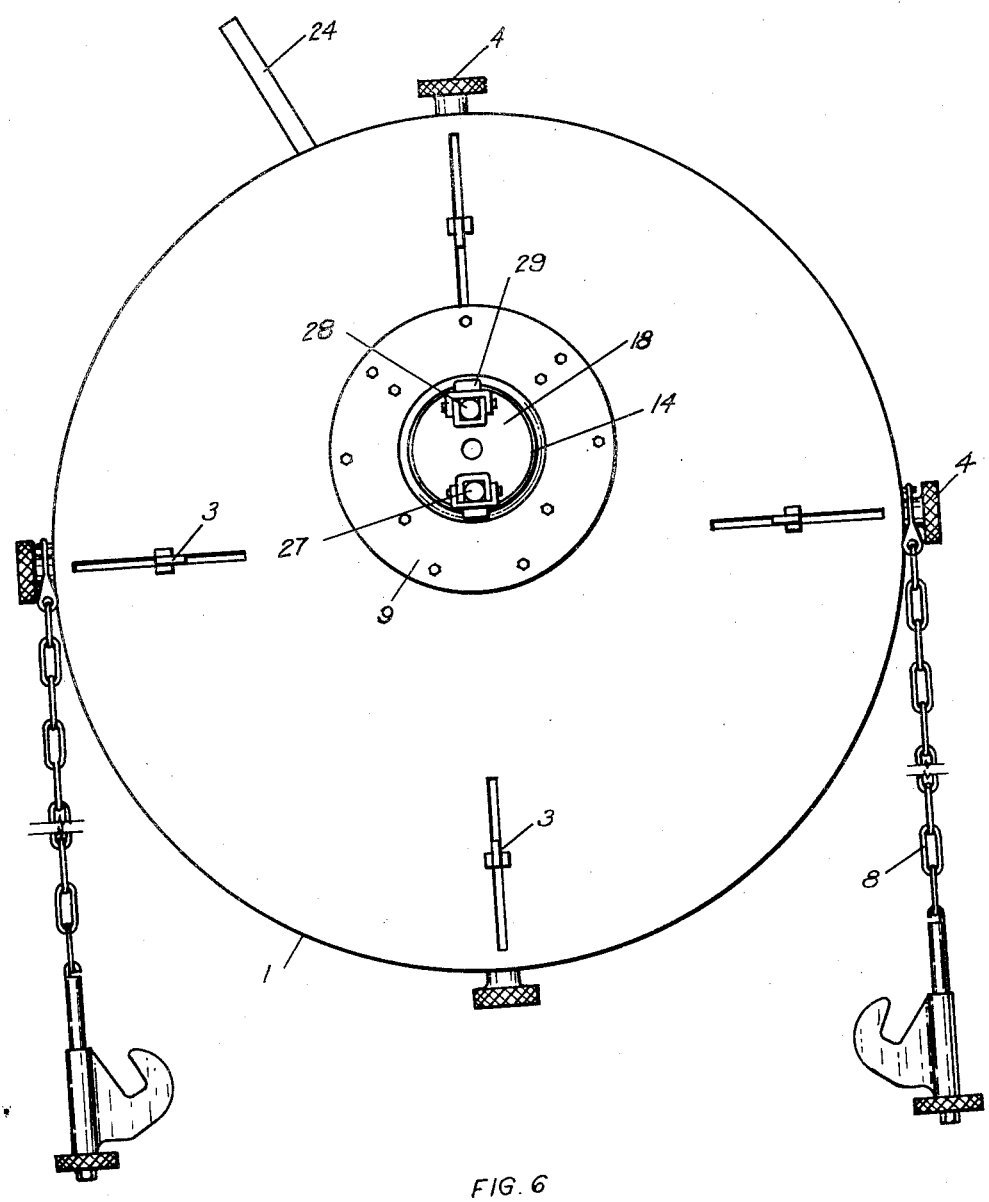
Fig. 6 is a bottom plan of the mechanism.

Referring now to the drawings, a circular steel plate 1 carries the entire mechanism and has reinforcing angles 2 on its perpendicular and horizontal axes. The ends of the angles and the plate are slotted for the reception of hooks 3 (see Fig. 6) for engaging the overhanging edge of container. Hooks 3 may be moved in the slots by adjusting screws 4 retained at the ends of the angles 2 by welded bearings. The slots in plate 1 and angles 2 are closed by covers 6 secured to the angles. On the horizontal angles, handles 7 are secured in order to place the entire device over the end of a container. Safety chains 8 are secured to the ends of horizontal angles 2 and carry adjustable hooks on their opposite ends for engagement over the opposite edge of the container.

On the plate 1 is bolted a socket comprising inner socket 9 and outer socket 11. Outer socket 11 has five projections cast integral with it, three for ball locking screws 12 to prevent angular movement of the ball after it has been set, and two ball locking set screws 13 to prevent rotation of the ball in its socket. The inner and outer sockets are bolted together to form an inner spherical surface.

Retained by the socket members is a ball member 14 having a cylindrical projection 15. Secured to projection 15 is a ball rotating stop 16 for cooperation with set screws 13. The cylindrical wall of projection 15 has two diametrically opposite rectangular openings 17 for cooperation with a latch on the rotor, hereinafter described.

Figure 1:
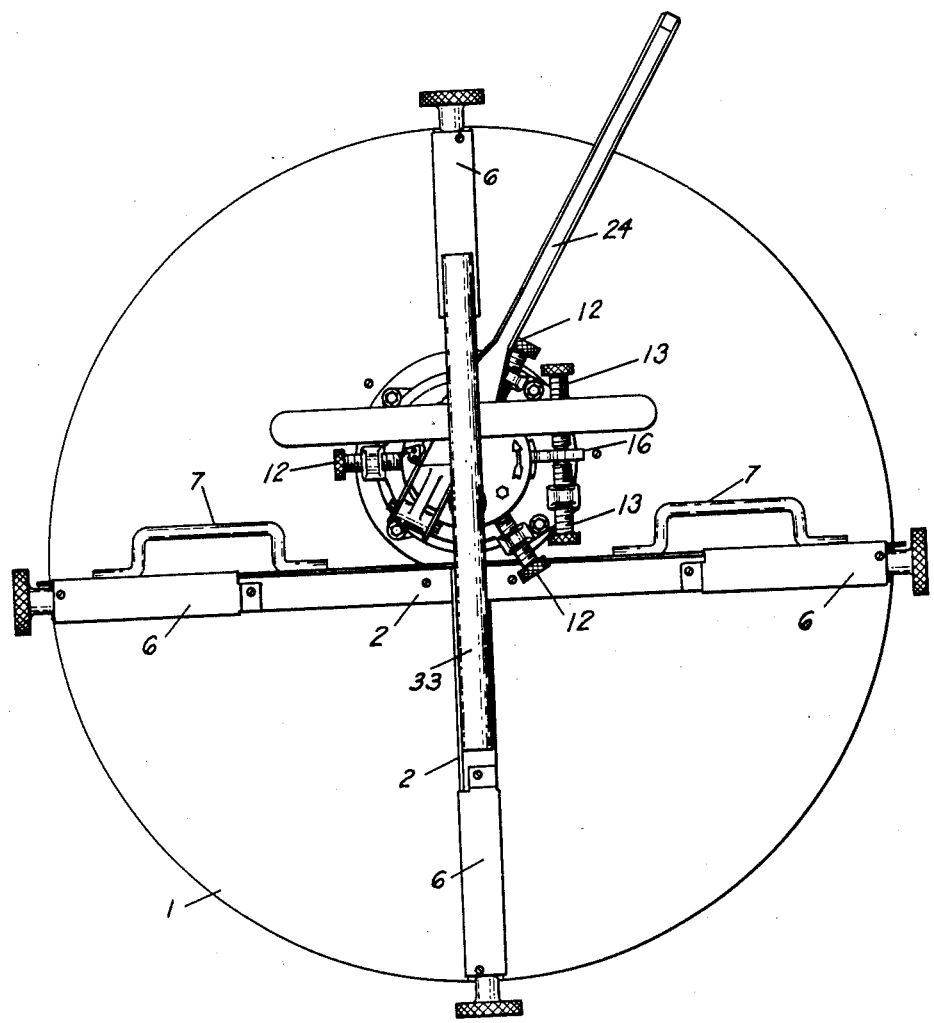
Figure 2:
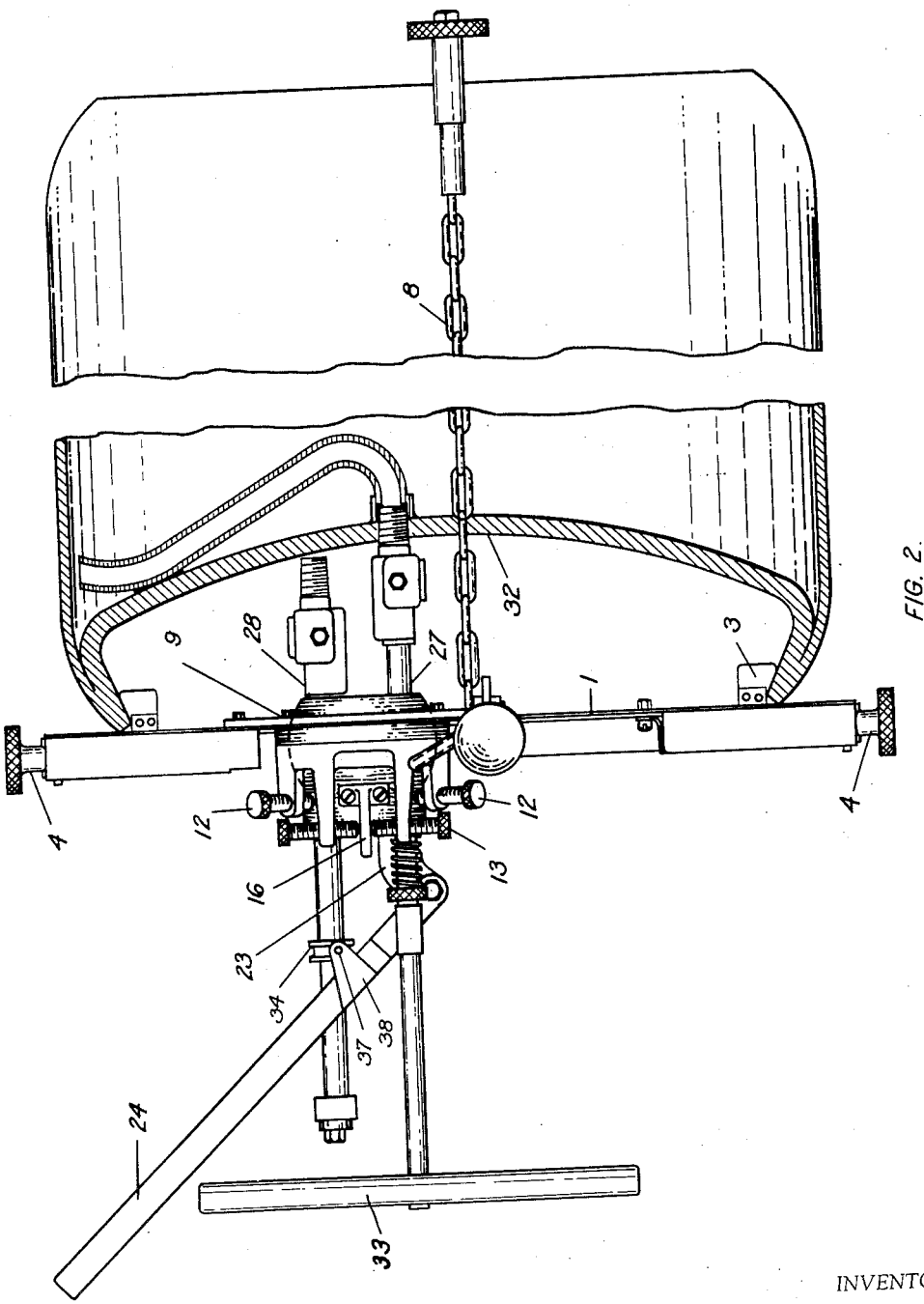
Fig. 2 is a side elevation showing the mechanism attached to a one-ton container.
Figure 3:
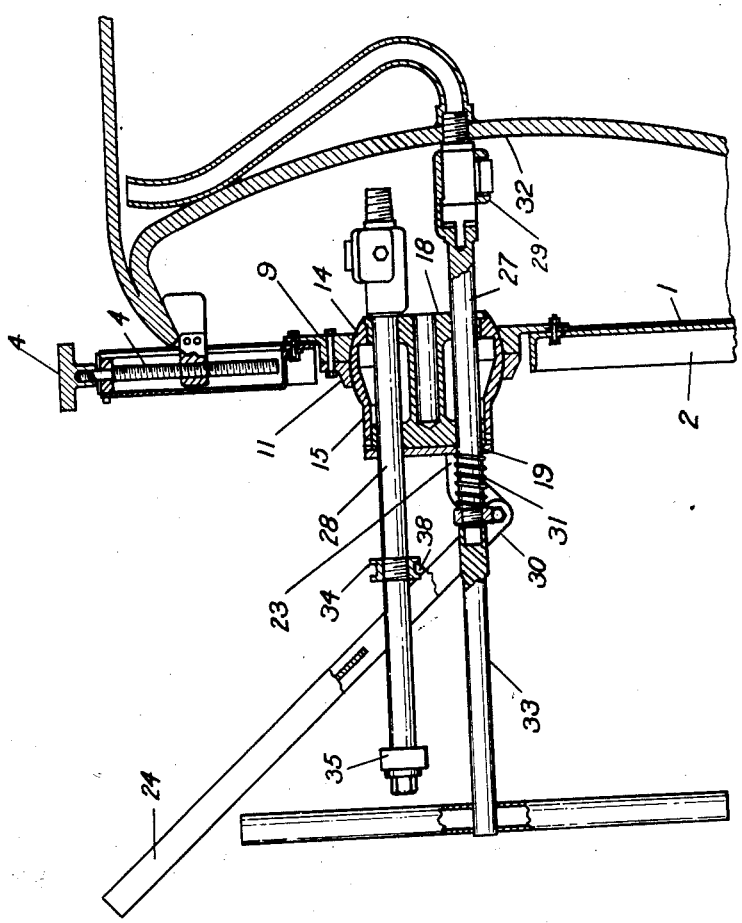
Fig. 3 is a part section.
Figure 4:
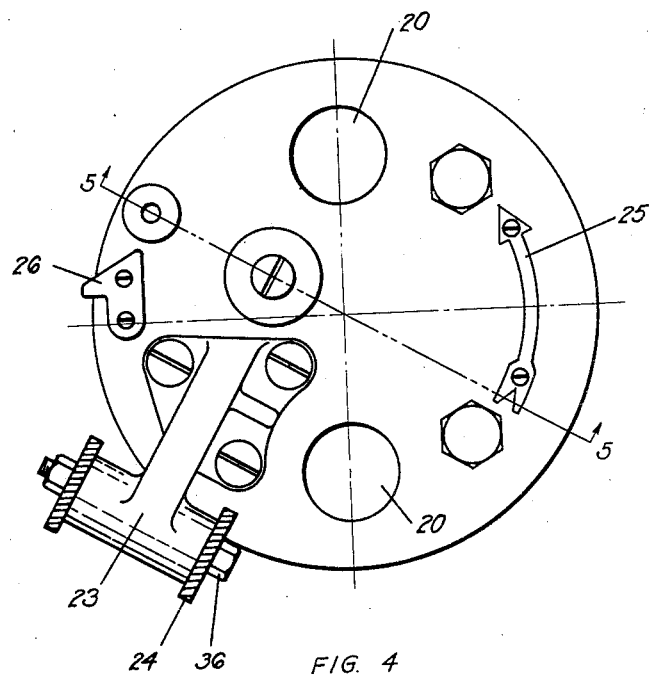
Fig. 4 is a top plan of the rotor.

A rotor 18 is positioned within ball 14 and cylindrical extension 15 and has a bearing at each end as seen in Fig. 3. Rotor 18 therefore follows the angular positions of ball 14 but is free to rotate therein and is prevented from longitudinal movement by a flange on its inner end and an overhanging plate 19 secured to its outer end.

Figure 5:
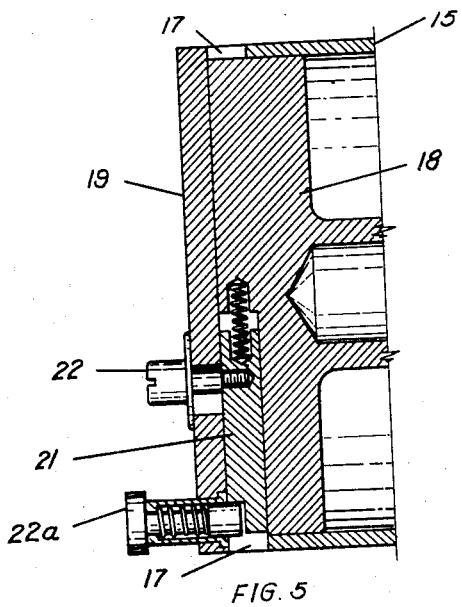
Fig. 5 is a section on line 5—5 of Fig. 4.

Rotor 18 and plate 19 have two holes 20 therethrough for the valve socket wrenches. The outer end of the rotor is grooved for the reception of a radially slidable, spring-pressed latch 21 (Fig. 5) retractable by button 22. This latch is adapted to engage one of the diametrically opposite openings 17 in projection 15, to thereby lock the rotor in either of two positions. Latch 21 may be held in retracted position by spring-pressed button 22a which will automatically engage a shoulder on latch 21 when the same is retracted.

On the rotor cover plate 19 is mounted a lever bracket 23 which serves as a fulcrum for the new valve lever 24, hereinafter described. A direction arrow 25 and stop indicator 26 are mounted on cover plate 19. Rotor 18 is adjustable to two positions; one called the old valve position when the old valve is being removed, and one called the new valve position 180° spaced from the old valve position and used when screwing the new valve in place. The rotor is locked in either position by latch 21 engaging in one of the openings 17 in the cylindrical extension 15.

Two socket wrenches are required for changing valves, old valve wrench 27 and new valve wrench 28. The old valve wrench 27 carries a cap 29 which engages over and may be secured to the old valve such that the wrench and valve are rigidly connected and the wrench is supported from the valve when mounted on the container. The opposite end of wrench 27 has a square end to receive handle 33. Just below the square portion on wrench 27 is a threaded collar 30 which retains spring 31, the opposite end of which bears against plate 19 of the rotor. When the old valve is unscrewed, spring 31 forces wrench 27 and the old valve away from the container head 32 so there will be no interference with it when swinging the new valve in place. The square end of old valve wrench receives the old valve wrench handle 33.

The new valve socket wrench 28 retains and supports a new valve in the same manner as the old valve wrench is secured to the old valve. About mid-way on wrench 28 above plate 19 a grooved collar 34 is threaded, a portion adjacent the end of wrench 28 being square to receive the new valve handle 35 which is held in place by a nut on the end of wrench 28.

Grooved collar 34 receives two pins 37 mounted on plates 38 secured to handle 24, the inner end of the handle carrying a lever bolt 36 by means of which the handle 24 may be removably pivoted to bracket 23 on plate 19. By means of pivoted handle 24, the new valve wrench may be pressed inward against the pressure of escaping chemical with very little effort.

In order to securely mount the valve changing mechanism on a container, the two safety chains 8 are secured to the plate 1 and may be hooked over the rear end of the container. These chains include mechanism to adjust their length so that they can be tightened.

*Operation.*—Although capable of use with other containers, the invention particularly described herein is especially adapted for use in replacing valves of so-called ton containers. These containers have inwardly curved heads into which the valves are screwed. Since the valves are not positioned in the center of the heads, the valves are angularly positioned with respect to the longitudinal center line of the container. Although these containers usually have two valves in their heads, only one valve is shown, since the changing of the second valve is similar to the first.

After the clearance between the base of the old valve and the container top has been measured to be certain that there will be no interference, the old valve wrench 27 is secured to the old valve. This is done by securing the socket 29 to the old valve. The container should be resting in horizontal position with the old valve to be changed at the top. Assemble a new valve to the new valve wrench 28. With plate 1 in upright position, move rotor 18 clockwise to old valve position, that is, to position where old valve opening 20 is down, and lock in this position by pulling lock bolt latch 22a. This allows lock bolt 22 to enter one of notches 17 on extension 15, thus locking rotor 18 and plate 19 to ball 14.

Figure 7:
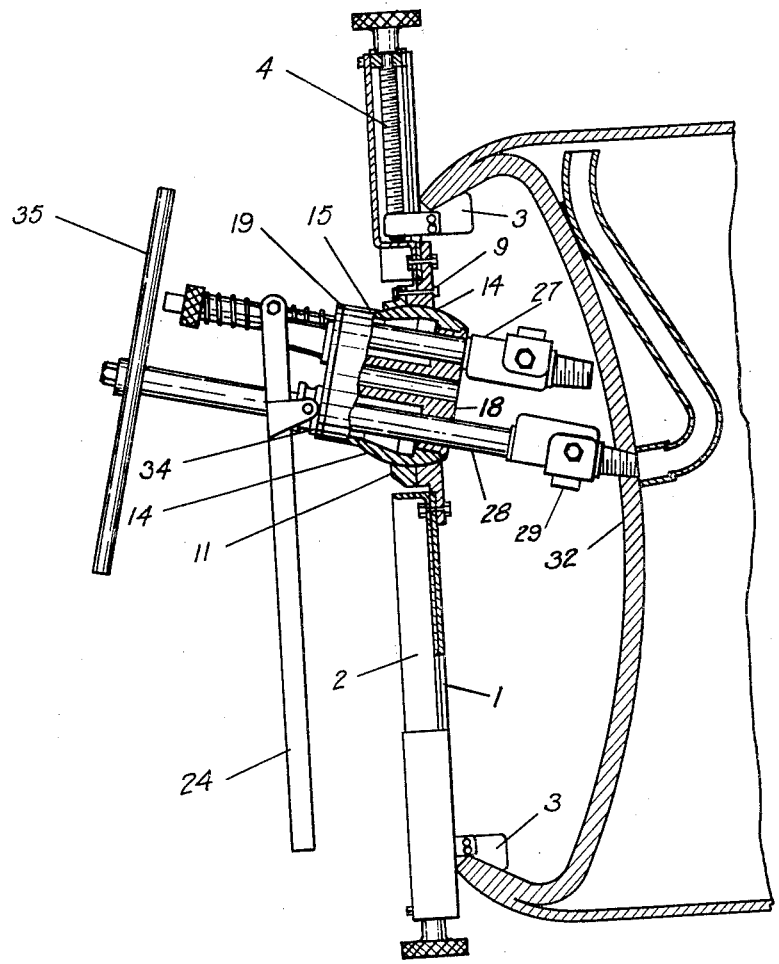
Fig. 7 is a section showing the new valve being screwed in place, this view showing an extreme angular position of the valve.
Figure 8:
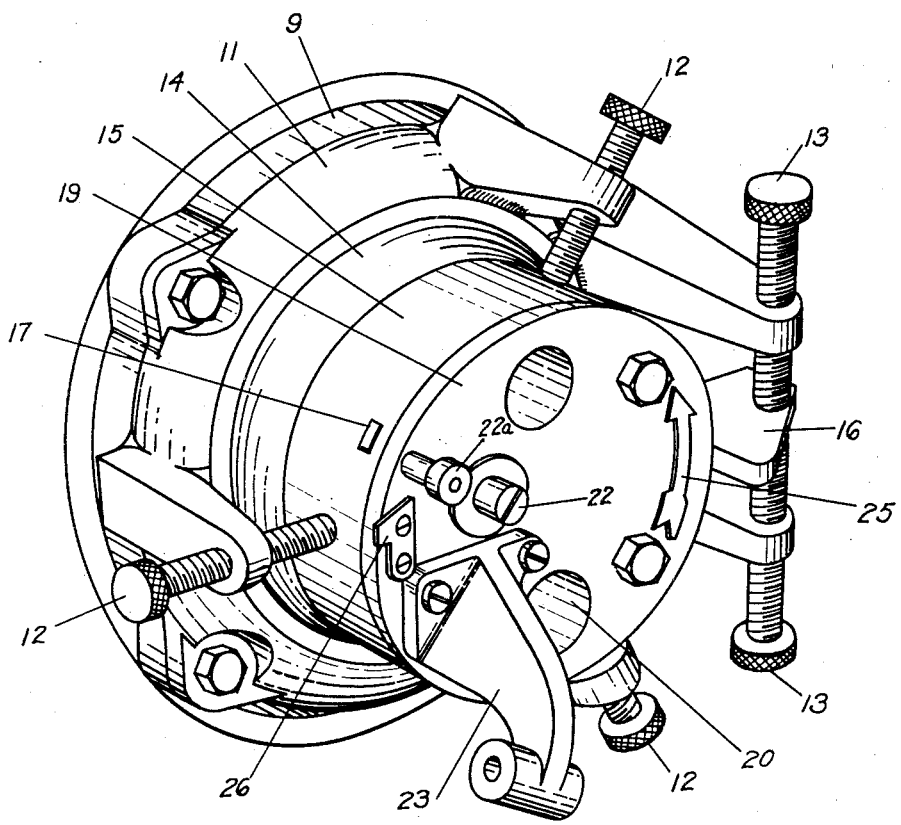
Fig. 8 is a perspective of the mechanism with the valve wrenches removed.
Figure 9:
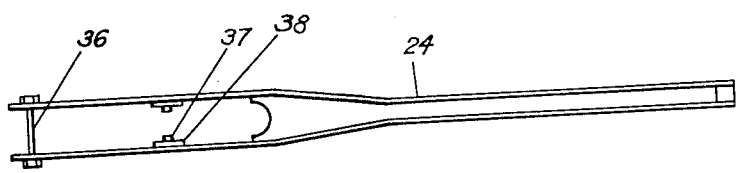
Fig. 9 is an elevation of the new valve lever.

The three ball locking screws 12 and the two ball-rotating stop screws 13 are then retracted to thus allow ball 14 free movement. The mechanism is then lifted by handles 7 and placed over the end of the container with the old valve wrench 27 (previously attached to old valve) projecting through lower opening 20 of rotor. The adjusting lug screws 4 are then tightened so that lugs 3 are moved to grip the chime of the container. As seen in Fig. 7, this chime curves inwardly on the container illustrated, whereby a firm support for the mechanism is obtained.

The protruding end of old valve wrench 27 is then moved up and down and sideways until there is play between it and its bearing. The three ball locking screws 12 are then tightened so that their ends touch the cylindrical projection 15 of ball 14, thus holding the ball in adjusted position, whereby the old valve wrench and the parallel new valve wrench 28 may be turned to align with the screw threaded valve opening in the container head. Then the screws 13 are turned inwardly against stop 16, thus preventing rotation of ball 14. Safety chains 8 are then hooked over the opposite end of the container and tightened.

Old valve wrench 27 should again be tested to be sure that it is free in its bearing, and if necessary some of the lugs 3 are loosened to get free play of wrench 27 and then tightened. Then assemble spring 31 and collar 30 on old valve wrench and put handle 33 on the end thereof. Pull new valve lever 24 back toward the operator, and unlock the rotor by sliding lock bolt 21 radially, thus clearing its end of opening 17, until latch 22a engages.

Unscrew old valve and when it has cleared the screw threads, spring 31 will force the wrench 27 away from container. Slip handle 33 off and drop it and grasp new valve lever 24 and turn rotor 180° counterclockwise in direction of arrow 25. Indicator 26 will contact ball rotating stop 16 to limit rotation. New valve lever 24 is then pressed inwardly and by way of pins 37 and collar 34 the new valve wrench 28 and its new valve are moved inwardly.

The leverage obtained by lever 24 is such that the valve may be easily held against the pressure of the escaping gas or liquid. Lever 24 may be manipulated by the left hand of the operator, who then rotates new valve wrench handle 35 with the right hand to engage the new valve in place.

If for any reason the new valve threads do not readily engage the container threads, the old valve may be quickly replaced by swinging the rotor clockwise to the old valve position. The latch 22 will snap into opening 17, thus accurately aligning the old valve, and by way of handle 33, the old valve may be replaced.

The apparatus herein described is capable of readily removing and replacing any valve the longitudinal center line of which is not more than 13° out of alignment with the longitudinal center line of the container. The entire mechanism can be assembled in five minutes and the valve changed in ten seconds, with gas escaping at full force from the container for only two or three seconds.

It will be understood that the invention is not limited to the precise details herein shown by way of illustration, since the construction may be varied by those skilled in the art without departing from the spirit of the invention nor exceeding the scope of the appended claims.

I claim:

1. A mechanism for changing valves of filled containers comprising a plate adapted to be secured to the container, a rotatable member having parallel openings equally spaced from the axis of rotation of said member, a valve wrench in each opening, means for universally supporting said member on said plate for rotation around said axis and for oscillation to change the angle of said axis to said plate, and means for securing said rotatable member against oscillation and in a predetermined angular position while allowing free rotation of said member about the axis as previously located.

2. The invention as defined in claim 1, wherein said rotatable member has a portion of its external surface spherical in shape, and the means for universally supporting said member has a similarly shaped socket.

3. A mechanism for changing valves of filled containers comprising a plate adapted to be secured to the container, a universal ball member and socket mounted on said plate, said ball member having two parallel valve wrenches each free to rotate, said wrenches being equally spaced from and on opposite sides of the axis of rotation of said ball member, said socket allowing rotation of said ball member and oscillation thereof to change the angle of the axis of said member, and means for securing said ball member against oscillation and in a predetermined angular position while allowing rotation of said member about the axis as previously located.

4. The invention as defined in claim 3, wherein said valve wrenches project on opposite sides of said ball member, each wrench having means at one end thereof to secure a valve thereto.

5. The invention as defined in claim 3, wherein stops are provided to limit rotation of said ball member to 180°.

6. The invention as defined in claim 3, wherein said valve wrenches project on opposite sides of said ball member, and a spring normally pressing one valve wrench away from the container.

7. A mechanism for changing valves of filled containers comprising a plate adapted to be secured over the valved head of the container, a universal ball and socket on said plate, said ball being angularly adjustable, a rotary member journaled in said ball, parallel valve wrenches mounted in said rotary member, said wrenches being equally spaced from the axis of rotation of said member, means for securing valves to said wrenches, means for securing said ball and said rotary member against oscillation and in predetermined angular position while allowing rotation of said member, and a lever connected to one valve wrench whereby the valve on said wrench may be held against the pressure of fluid in the container.

8. The invention as defined in claim 7, including means to latch said rotary member with either valve wrench aligned with the valve on the container.

9. A mechanism for changing valves of filled containers comprising a plate adapted to be secured over the valved head of a container, a ball and socket on said plate, a rotary member journaled in said ball, parallel new valve and old valve wrenches mounted on said rotary member, said wrenches being equally spaced from the axis of rotation of said rotary member, means to lock said ball and rotary member in angularly adjusted position while allowing rotation of the rotary member, a lever pivoted on said mechanism and swivelled to said new valve wrench to allow rotation of said wrench, and means to latch said rotary member in either of two positions, one position with the old valve wrench aligned with the valved opening in the container and the other position with the new valve wrench so aligned.

FRANK B. HALE.